March 17, 1931.  A. O. AUSTIN  1,796,428

LINK INSULATOR FITTING

Filed July 2, 1926  2 Sheets-Sheet 1

INVENTOR.
Arthur O. Austin
BY Nissen & Crane
ATTORNEYS

March 17, 1931.  A. O. AUSTIN  1,796,428
LINK INSULATOR FITTING
Filed July 2, 1926   2 Sheets-Sheet 2

INVENTOR.
Arthur O. Austin
BY Nissen & Crane
ATTORNEYS.

Patented Mar. 17, 1931

1,796,428

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF OHIO

LINK-INSULATOR FITTING

Application filed July 2, 1926. Serial No. 120,092.

This invention relates to fittings for insulators of the ring or disk type and has for its object the provision of fittings of the class named which shall be of maximum strength for the amount of material employed which shall be convenient to install and which shall be of an improved construction and operation. The invention is exemplified in the combination and arrangement of parts shown in the accompanying drawing and described in the following specification and it is more particularly pointed out in the appended claims.

In the drawings—

The invention relates to improved links or fittings and attachments for coupling up insulators, primarily those having metallic members threaded through dielectric members. Link or strain insulators, particularly of the smaller sizes are used for heavy tensions such as in heavy distribution lines and in guying poles or structures. For this work it is desirable to produce a fitting of high mechanical strength which is simple to install and which will be low in cost and, at the same time, will transfer the mechanical load properly to the dielectric member and develop its insulation as far as possible.

Figure 1:
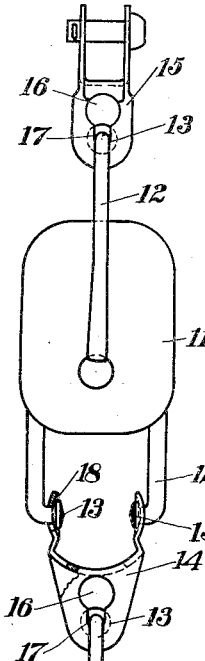
Fig. 1 is an elevation of a pair of insulators connected in series by fittings embodying the present invention.

In Fig. 1 insulators 11 have interlinked holding members 12. The interlinked members 12 have heads or enlarged ends 13. The links are coupled up by the use of connecting plates 14 and end attachments 15. The connecting plates may be made to connect up the links in line or at right angles as shown in Fig. 1. Plates 14 have holes 16 slightly larger than the heads 13 of the links. The holes have a slot 17 large enough for the section of the bolt or link next to the head. The links 12 are threaded through the insulator and the bolt heads 13 placed opposite the opening 16. The links 12 are then sprung inward so that the bolt heads will pass through the opening 16 after which the bolt is drawn so that the small diameter is in the slot 17. The bolt is then allowed to spring outward which will cause the head of the bolt to rest in a slight cup 18. This tends to hold the bolt in place and prevent it from becoming disengaged. This style of fitting has the advantage that a high strength may be developed. The link parts may be made of castings, forgings, or sheet material. A load or tension placed on the combination tends to lock links 12 more firmly in the fittings so that they cannot become disengaged. The fitting has the further advantage that by properly proportioning the holes and width between the adjacent sides of the fitting the sides of the link 12 may be made to bear against the insulator 11 so as to keep it properly lined up.

Figure 2:
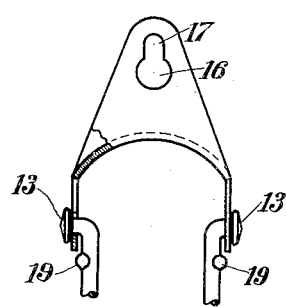
Fig. 2 shows an end fitting of a slightly modified construction.

Fig. 2 shows a little different form of the link or bolt 12. In this case the heads of the bolt 13 are turned outward and the bolts provided with projections 19. The spring in the bolt tends to cause these projections to strike the plate or fitting and prevent it from becoming disengaged after the links are in place.

Figure 3:
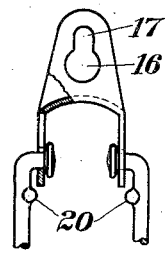
Fig. 3 is a view similar to Fig. 2 but showing a different modification.

Fig. 3 shows the bolts turned inward, but with the small projections 20. These are so proportioned that some force is required to draw the bolts into final position. Once in position the projection 20 will tend to strike the coupling fitting and prevent it from becoming disengaged.

Figure 4:
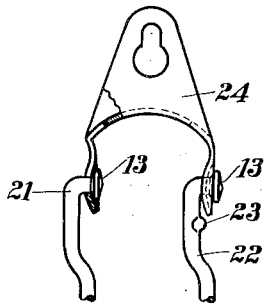
Fig. 4 is a view similar to Fig. 2 and Fig. 3 showing a further modification.

A construction which may be used with very heavy stiff bolts is shown in Fig. 4. In this case the heads 13 of the bolts are turned in the same direction. The outward spring on the end 21 will tend to cause it to engage in the recess of the fitting while the outward spring on the end 22 will tend to cause the small projection 23 to engage the fitting, tending to prevent the bolts and the coupling plate 24 from becoming disengaged. This style of fitting does not require bending of the bolts to put it in place, as the fitting 24 may be put over both bolt heads by moving it in one direction.

Figures 5, 6:
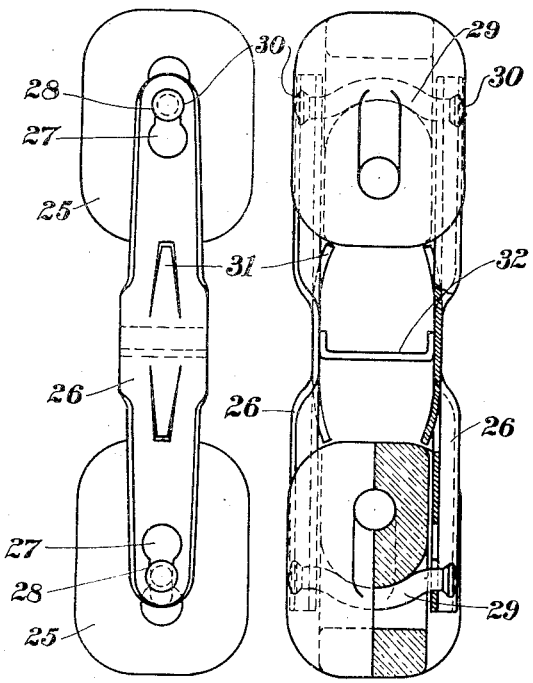
Fig. 5 is an elevation showing a pair of insulators having another form of the invention applied thereto.
Fig. 6 is an elevation with parts and section taken at right angles to Fig. 5.

In the form of the invention shown in Figs. 5 and 6 the insulators 25 are connected by plates 26 which have their ends curved and fitted into grooves in the sides of the insulators. The ends of the plates 26 are provided with openings 27 having restricted extensions 28 arranged to engage bars 29 which extend through the openings in the insulators. The bars 29 are curved to fit the curvature of the openings in the insulators, but instead of having extended legs as in the forms previously described, they are provided with heads 30 adjacent the opposite faces of the insulator which are of a size to pass through the openings 27 and interlock with the restricted extensions 28. The parts are assembled by placing the openings over the heads 30 and exerting tension on the insulators 25 to pull the bars 29 into the restricted extensions 28. The plates 26 are provided with spring tongues 31 which snap into position against the ends of insulators to hold the parts in their assembled position. The tongues 31 may be merely cut out before assembling the parts and when the parts are in position, the tongues may be pushed in and given a permanent set to retain the parts in place. It will be seen that this arrangement provides a fitting which is easily attached to the insulators, which provides a relatively short coupling and which will remain in position when assembled.

The plates 26 are connected to each other by any suitable means which will permit the necessary relative movement to assemble the parts. The transverse plate 32 is shown for this purpose in the drawing.

Figure 8:
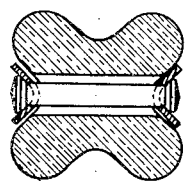
Fig. 8 is a horizontal section on line 8—8 of Fig. 7.
Figure 7:
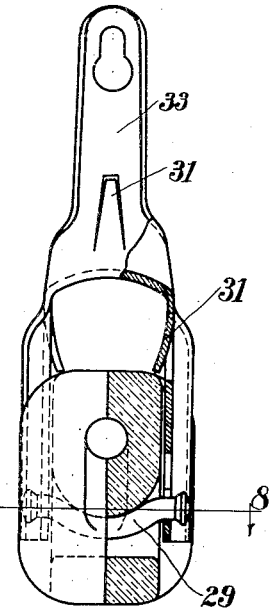
Fig. 7 is an elevation showing another modification.

In the form of the invention shown in Figs. 7 and 8 the arrangement is similar to that shown in Figs. 5 and 6 except that the connecting fitting is formed from a single plate having flanges or arms 33 bent laterally from the plate and arranged in oppositely extending pairs, the pairs being oriented to an angular position of ninety degrees relative to each other.

Figures 9, 10:
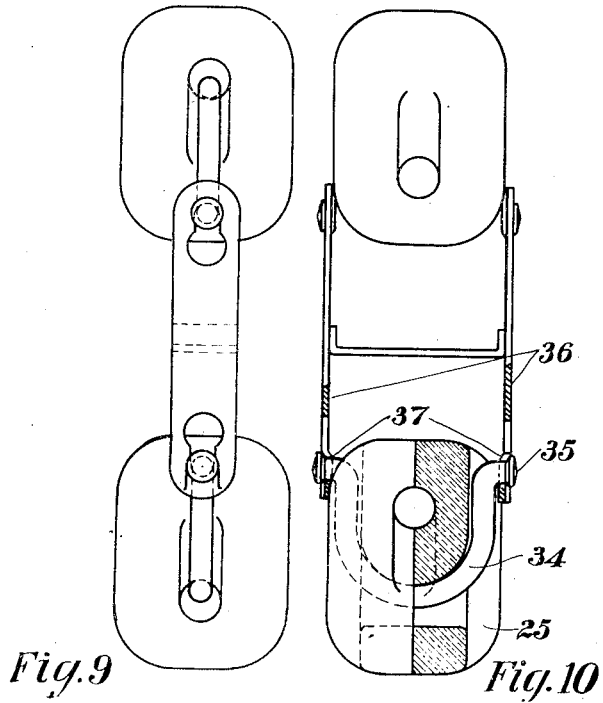
Fig. 9 is an elevation of another modification.
Fig. 10 is an elevation at right angles to Fig. 9 with parts in section.

In the form of the invention shown in Figs. 9 and 10, the bars 34 which pass through the insulators, are provided with longer shanks to bring the interlocking heads 35 nearer the inner ends of the insulators. The side plates 36 need not be so long as in the form shown in Figs. 5 and 6. The plates 36 may be off-set inwardly as shown at 37 to provide shoulders which tend to hold the heads 35 from becoming disconnected.

I claim:

1. An insulator fitting comprising a member having substantially parallel spaced flanges thereon, arranged with parallel faces opposite each other and provided with transverse openings each opening having a restricted extension and a U bolt having transversely bent portions at the ends thereof provided with heads of a size to enter said openings, one of said flanges and one leg of said U-bolt having cooperating retaining means thereon for retaining the transversely bent portion of the U-bolt leg in the restricted extension of the opening in the flange, said U-bolt having an initial set tending to draw said retaining means into cooperative relation.

2. An insulator fitting comprising a yoke member formed of a plate of sheet metal and having two pairs of oppositely disposed ears bent to extend transversely to the plane of said plate at opposite sides thereof forming oppositely extending pairs of flanges, the flanges of each pair being substantially parallel and having transverse perforations therethrough with restricted extensions and U bolts extending in opposite directions from said yoke member and having laterally off-set heads arranged to enter the openings in said flanges and to interlock with the restricted extensions of the said openings.

3. An insulator fitting comprising a plate having oppositely extending pairs of flanges, the flanges of each pair being substantially parallel and having transverse openings therethrough, provided with restricted extensions, a pair of U bolts extending in opposite directions from said plate and having laterally off-set heads on the ends thereof arranged to enter the openings in said respective pairs of flanges and to interlock with the restricted extensions thereof, said flanges and said U-bolts having cooperating retaining means for holding said heads interlocked with said extensions while said U bolts have initial set tending to move said retaining means into cooperative relation.

4. An insulator fitting comprised of a member having a transverse opening therein provided with a restricted extension, a second member having a laterally offset head arranged to enter said opening and interlock with said extension, said second member having a projection thereon spaced from said offset head in position to prevent accidental displacement from said head of said opening.

5. An insulator fitting comprising a member having a pair of spaced flanges having openings therein provided with restricted extensions and a U bolt having laterally offset heads at the ends thereof arranged to enter said openings and interlock with said restricted extensions, one leg of said U bolt having a projection thereon at the same side as its laterally offset head but spaced from said head in position to engage the flange to which said head is connected when said head is moved from the restricted extension of said opening to the larger portion thereof.

In testimony whereof I have signed my name to this specification on this 29th day of June A. D. 1926.

ARTHUR O. AUSTIN.